(12) United States Patent
Bascom et al.

(10) Patent No.: US 6,598,814 B2
(45) Date of Patent: Jul. 29, 2003

(54) FIBER CHOPPER

(75) Inventors: Randall C. Bascom, Wauseon, OH (US); William J. Sandretto, Maumee, OH (US); Billy Ray Stinnett, Benton, TN (US); Donald S. Perry, Athens, TN (US)

(73) Assignee: Johns Manville International, Inc., Denver, CO (US)

( * ) Notice: Subject to any disclaimer, the term of this patent is extended or adjusted under 35 U.S.C. 154(b) by 374 days.

(21) Appl. No.: 09/771,237

(22) Filed: Jan. 26, 2001

(65) Prior Publication Data

US 2002/0100349 A1 Aug. 1, 2002

(51) Int. Cl.⁷ ................................................ B02C 4/08
(52) U.S. Cl. ...................... 241/27; 241/185.5; 241/235; 241/242; 241/293
(58) Field of Search .......................... 241/185.5, 186.2, 241/235, 242, 291, 292.1, 293, 222, 27, 29; 83/345, 347, 913

(56) References Cited

U.S. PATENT DOCUMENTS

| 3,508,461 | A | | 4/1970 | Stream | 83/344 |
| 3,771,701 | A | | 11/1973 | Brunk et al. | 226/1 |
| 3,815,461 | A | | 6/1974 | Genson | 83/347 |
| 3,869,268 | A | | 3/1975 | Briar et al. | 65/2 |
| 3,873,290 | A | * | 3/1975 | Marzocchi | 241/222 |
| 4,347,071 | A | | 8/1982 | Willis et al. | 65/10.2 |
| 4,398,934 | A | | 8/1983 | Willis et al. | 65/2 |
| 5,697,560 | A | * | 12/1997 | Bennett | 241/29 |
| 5,970,837 | A | | 10/1999 | Arterburn et al. | 83/552 |
| 6,076,442 | A | | 6/2000 | Arterburn et al. | 83/13 |
| 6,527,211 | B1 | * | 3/2003 | Bellasalma | 241/222 |

* cited by examiner

Primary Examiner—John M. Husar
(74) Attorney, Agent, or Firm—Robert D. Touslee

(57) ABSTRACT

A method and apparatus for chopping long unwound items like fiber, fiber strands, yarn, etc. having an idler roll for pressing the item(s) against a backup roll for pulling the item(s) into the chopper uses an improved mount for the idler roll that maintains the outer peripheral surface of the idler roll into more consistent contact with more consistent force with the item(s) being chopped.

20 Claims, 7 Drawing Sheets

FIBER CHOPPER

BACKGROUND

The present invention involves an improved chopper for chopping continuous or very long loose items such as fiber, fiber strands, yarn, wire, string, ribbon, tape and the like by pulling the item(s) into the chopper while the loose items are held tightly against the surface of a rotating backup roll with a rotating idler roll biased against the backup roll and carrying the item(s) on into a nip between a rotating blade roll and the rotating backup roll where they are separated into short pieces. More specifically the present invention involves a chopper having an improved mounting for an idler roll which allows the idler roll to reliably self align with the surface of a back up roll to more reliably and more effectively hold down and pull item(s) being pulled and chopped such as loose wet or dry strands of glass fibers with, or without, a chemical sizing thereon.

It has long been known to chop continuous fibers or fiber strands into short lengths of about 3 inches or shorter. Billions of pounds of such product including chopped glass fibers and fiber strands are produced each year in process and chopping apparatus such as disclosed in U.S. Pat. Nos. 5,970,837, 4,398,934, 3,508,461, and 3,869,268, the disclosures of which are incorporated herein by reference. The choppers disclosed in these patents comprise a blade roll containing a plurality of spaced apart blades for separating the fibers into short lengths, a backup roll, usually driven, which the blades work against to effect the separation and which pulls the fibers or fiber strands and an idler roll to hold the fibers or fiber strands down onto the surface of the backup roll. In the chopped fiber processes disclosed in these patents, the chopper is usually the most productivity limiting equipment in the processes which are 365×24 type processes, i.e. operate continuously every day of the year, 24 hours each day. Therefore, improvements in the chopper which allow the chopper to pull and chop faster, for longer times between maintenance shutdowns, and/or to pull and chop more fibers or fiber strands at a time have an extremely positive impact on productivity and production costs.

In the published prior art the idler roll has been mounted and held against the surface of the back up roll in a generally rigid manner and with a variable force such as a force applied by an air or hydraulic cylinder. The working surface of the idler roll has been knurled and chrome plated in the past to better grip the fibers or fiber strands to prevent the fibers or fiber strands from sticking to the roll and wrapping and to avoid having to shut the chopper down to remove the wrap. Normally several strands such as up to 14 are fed into the chopper, each strand containing 2000 or more fibers. As more fiber strands and fibers are fed into the chopper it becomes more difficult to pull all of the strands and fibers at the same speed, so more pressure is applied to the cylinder pushing the idler roll against the backup roll with more force. If all of the strands or fibers are not pulled at the same speed, the slower strands and fibers will have a greater fiber diameter which is unacceptable and the bushings of the slower strands frequently will not operate at the proper temperature causing more frequent breakouts and/or additional fiber diameter variations, both of which are unacceptable. Also, fiber slippage can cause some of the fibers to be cut to shorter lengths than desired resulting in an unacceptable product.

As the pulling speed is increased, and/or as the number of strands and fibers are increased, above about 3000–4000 ft./min. (FPM), depending on the product, the present state of the art choppers begin to vibrate and the idler roll begins to allow one or more of the strands to slip some thus reducing the pulling speed of one or more of the strands. Also, if all of the strands are not pressed between the idler roll and the elastomer layer of the backup roll, a strand can slip partially out of the nip leaving some of the fibers unchopped, producing double cuts and stringers in the chopped product and causing the product to be scrapped. This condition worsens as the backup roll and blades become worn with use, typically about 6–24 hours following a chopper rebuild in which the blade roll is replaced with a roll having new blades and the backup roll is replaced with either a refurbished or new backup roll. The backup roll has a working layer of polyurethane at least about a half inch thick on the surface of a metal wheel. As the chopper life increases the surface of the backup roll becomes chopped up due to the blades pressing and cutting into the polyurethane.

Periodically the backup roll must be removed and either the polyurethane layer turned down on a lathe or sander or must be replaced with a new layer of polyurethane. It would be very desirable to be able to run the chopper at higher speed without vibration and strand slippage to make good chopped fiber than is possible with the current state of the art choppers because the remainder of the process is capable of producing fiber that can be pulled much faster in terms of speed and pounds of fiber per hour than is currently possible. Also, in the preferred state of the art chopper the idler roll mount is exposed to broken fiber and sizing being thrown from the various rolls on the chopper and must be frequently cleaned to avoid serious malfunction at current speeds.

SUMMARY OF THE INVENTION

It has been discovered that the reason for certain strands slipping on the idler/backup roll of the current choppers is the manner in which the idler roll is mounted, the manner in which the force is applied to hold the idler roll onto the surface of the backup roll and the fact that the peripheral surface of a new and used backup rolls often have a slight taper from side-to-side or misalignment with the idler roll, either initially or after the new backup roll has been in use for a few hours.

The present invention is a chopper having an improved idler roll mount assembly for a chopper for separating long lengths of one or more unwound items selected from a group consisting of fibers, fiber strands, wires, strings, tape(s), strip(s) and ribbon(s) into short lengths while one or more of, preferably a plurality of, the long lengths of material are pulled into the chopper in an unwound form at speeds exceeding 1,000 FPM, preferably at speeds exceeding 2000 FPM by a rotating idler roll pressing the item(s) against the peripheral surface of an elastomer layer on the peripheral surface of a rotating backup roll which carries the item(s) on into a nip between the elastomer layer and a rotating blade roll. The item(s) being chopped can be either dry or wet with or without a chemical sizing on the surface of the item(s). The chopper having an improved idler roll mount assembly comprises a blade roll having a plurality of spaced apart blades in its peripheral surface, a backup roll having an elastomeric working layer on its periphery, and an idler roll, preferably having a knurled surface.

The improvement comprises a mount assembly for the idler roll having a yoke spaced from the peripheral surface of the idler roll that spans the length of the idler roll and beyond, each end of which turns down to support an axle about which the idler roll is free to rotate, a connector connecting said yoke to a shaft whose axis is perpendicular to an axis of said connector, said connector allowing said yoke to rotate back and forth around the axis of said connector, said shaft being held in a rotatable manner by a structural member of the chopper in such a manner that the outer peripheral surface of the idler roll is or can be in contact with, preferably with the full width of, the outer peripheral surface of the backup roll and/or item(s) on the outer peripheral surface to be chopped, an arm rigidly connected to said shaft, a source of a variable force for said arm or a means for applying a variable force to said arm, which force causes the outer peripheral surface of said idler roll to press against either the peripheral surface of said backup roll or against one or more of said items laying on the peripheral surface of said backup roll and thus holding the peripheral surface of said idler roll into pulling contact with said one or more of said items. Preferably, the chopper has an enclosed cabinet on the inboard side of the outboard face of the front plate and preferably at least some of the components of the idler roll mount are located in this cabinet to protect them from foreign matter in the environment around the idler roll. This foreign matter includes water mist, chemical sizing from the surface of fibers, dust and pieces of the item(s) being chopped.

The connector can either be a female socket or a male stub rigidly or rotatably attached to the shaft or to the yoke and the male stub is attached to either the yoke or to the shaft in either a rigid or rotatable manner. The preferred means for applying a force to the arm is either an air or hydraulic cylinder, most preferably an air cylinder, but can be other sources of force such as a high torque motor mounted to the structure of said chopper, the rotor of said motor eccentrically attached to said arm. The arm could be dispensed with by attaching the end of the shaft opposite the end portion attached to the connector to a rotor of a high torque motor, the latter being mounted appropriately to a frame member of the chopper.

Optional items on the present invention include an air purge system for applying positive fluid pressure to the interior of the yoke pivoting mechanism, including the connector, to prevent foreign matter like water, chemical sizing and fiber or fiber chips from entering and impeding the free pivoting action. The fluid is preferably air but could be other gases and liquids such as water. Also, the air purge system can include a fluid cooling system for the idler roll bearing(s) as well as positive fluid pressure in the interior of the idler roll, again to prevent intrusion by foreign material present in the vicinity of the idler roll during operation and cleaning. Other optional features include means for limiting the degree of rotation of the idler roll yoke or axis as an aid to a mechanic when changing a backup roll and locator means to aid the mechanic, etc. in replacing an idler roll or idler roll mount sub-assembly. Also, various known means for applying a force to press the idler roll into the item(s) being chopped and towards the surface of the elastomer layer can be used.

The invention also includes a method of chopping items as described above using an improved chopper containing an improved idler roll mount as described above to permit a higher productivity of chopped fiber than is obtained with prior art choppers while also enjoying an idler roll mount that does not require frequent cleaning to avoid malfunctions and/or scrap caused by an exposed idler roll mount and force actuator.

When the word "about" is used herein it is meant that the amount or condition it modifies can vary some beyond that so long as the advantages of the invention are realized. Practically, there is rarely the time or resources available to very precisely determine the limits of all the parameters of one's invention because to do so would require an effort far greater than can be justified at the time the invention is being developed to a commercial reality. The skilled artisan understands this and expects that the disclosed results of the invention might extend, at least somewhat, beyond one or more of the limits disclosed. Later, having the benefit of the inventors disclosure and understanding the inventive concept and embodiments disclosed including the best mode known to the inventor, the inventor and others can, without inventive effort, explore beyond the limits disclosed to determine if the invention is realized beyond those limits and, when embodiments are found to be without unexpected characteristics, those embodiments are within the meaning of the term about as used herein. It is not difficult for the skilled artisan or others to determine whether such an embodiment is either as might be expected or, because of either a break in the continuity of results or one or more features that are significantly better than reported by the inventor, is surprising and thus an unobvious teaching leading to a further advance in the art.

DETAILED DESCRIPTION OF THE INVENTION

Figure 1:
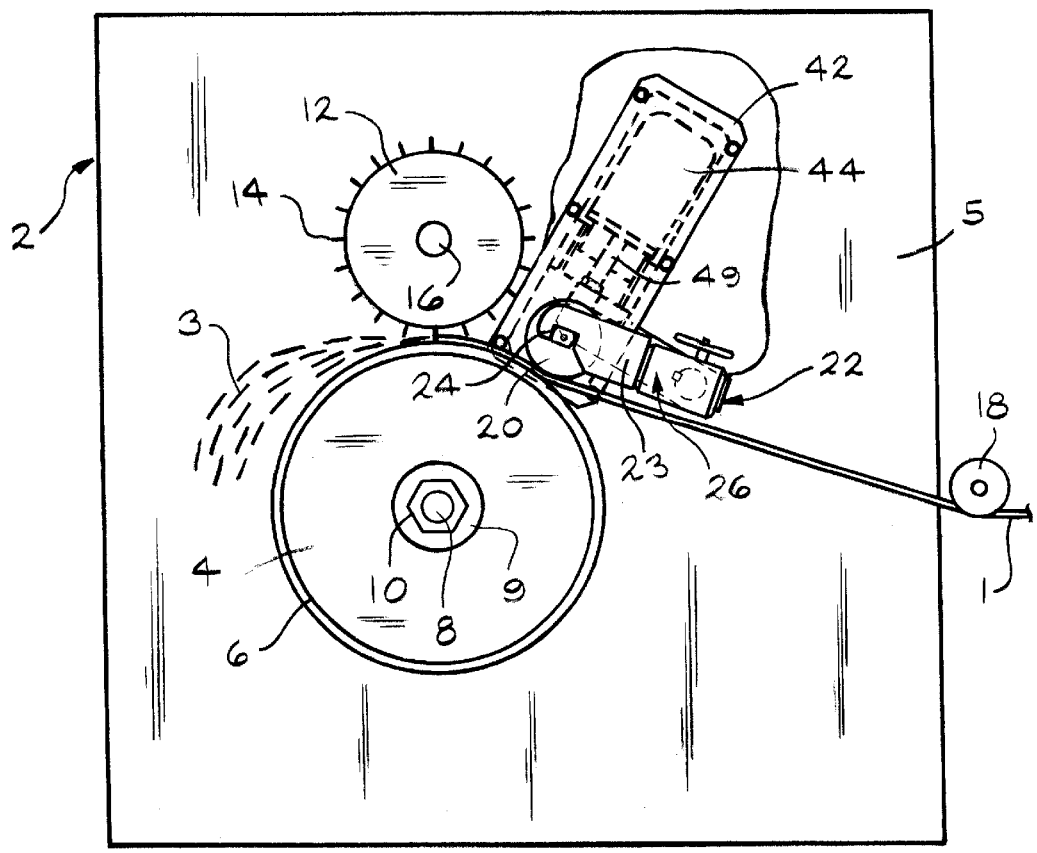
FIG. 1 is a front view of a chopper of the present invention with a portion cut away to show the novel idler roll mount assembly.

FIG. 1 shows a chopper 2 for separating long items such as fibers, fiber strands, strings, wires, tape(s) or ribbon(s) 1 into short lengths 3. Typically the short lengths are about 3 inches or less, but can be longer if the diameter of the blade roll 12 and the backup roll 4 are more than about one meter. For purposes of describing the invention an improved chopper 2 for separating long fiber strands, such as glass fiber strands, is illustrated. Such a chopper typically comprises a backup roll 4 having an elastomer layer 6 on its outer periphery and mounted on a rotating spindle 8 and held on with a large washer 9 and nut 10, a blade roll 12 having blades 14 spaced apart around its outer periphery and mounted on a rotating spindle 16 in a similar manner as the backup roll 4. The typical chopper also comprises a front plate 5, which preferably is an element of a conventional chopper frame (not shown) and a rotating idler roll 20 having a knurled surface that is pressed against the fiber strands 1 and the elastomer layer 6 of the backup roll 4. The idler roll 20 serves the purpose of pressing the fiber strands 1 against the rotating backup roll 4 which will help pull the fiber strands 1 at the desired speed into the chopper 2. Typically a strand separator and guide roll 18 mounted on or off the chopper is used to separate the fiber strands 1 and to guide them to the desired location on the backup roll 4.

The improved chopper 2 of the present invention comprises a novel and preferred idler roll mount assembly 22. The front plate 5 is partially cut away in FIG. 1 to show the parts of the idler roll mount assembly 22 that are behind the front plate 5.

The idler roll mount assembly 22 of the present invention is illustrated in FIGS. 1–5 and comprises a C shaped yoke 23 spaced from the outer peripheral surface and the ends of the idler roll 20 and attached to each end of an axle 24 for the idler roll 20. The yoke 23 is rotatably attached to a socket connector 26 with a stub shaft 25. The stub shaft 25 is preferably rigidly attached to the yoke 23, preferably by passing through the yoke at a location in which a longitudinal axis of the shaft will align generally close to a peripheral center line of the surface of the elastomer layer 6 of the backup roll 4 and is fixedly attached to the yoke 23 by welding, pinning or other suitable means in a known manner. By generally close is meant being within about 1 inch, preferably within about 0.5 inch and most preferably within about 0 to 0.25 inch from each other.

The connector 26 preferably has a first portion 27 having a first cylindrical opening 28 to hold the stub shaft 25 in a rotatable manner, preferably also lined with a bushing 29, preferably a lubricated bushing, that allows the stub shaft 25 to freely rotate in the first portion 27. The stub shaft 25 is retained in the first portion 27 by any known means such as by a snap ring 30, which allows rotation of stub shaft 25 but prevents significant axial direction movement.

The connector 26 has a second portion 31 which has a second cylindrical opening 32, the axis of which is perpendicular to the axis of the first cylindrical opening 28. The second portion 31 of the connector 26 is rigidly attached to the first portion 27 by any suitable means such as by the welds 33. The second cylindrical opening 32 surrounds an outboard end portion 35 of a main shaft 34. The outboard end of the main shaft 34 is spaced from the outer periphery of the stub shaft 25. The second portion is fixedly and removably attached to the main shaft 34 by any suitable means such as with a handle 36 and a first removable pin 37, such as a McMaster-Carr™ stainless steel positive locking quick release T-handle pin to allow the exposed idler roll parts to be quickly removed and replaced without opening the housing of the chopper 2.

Figure 4:
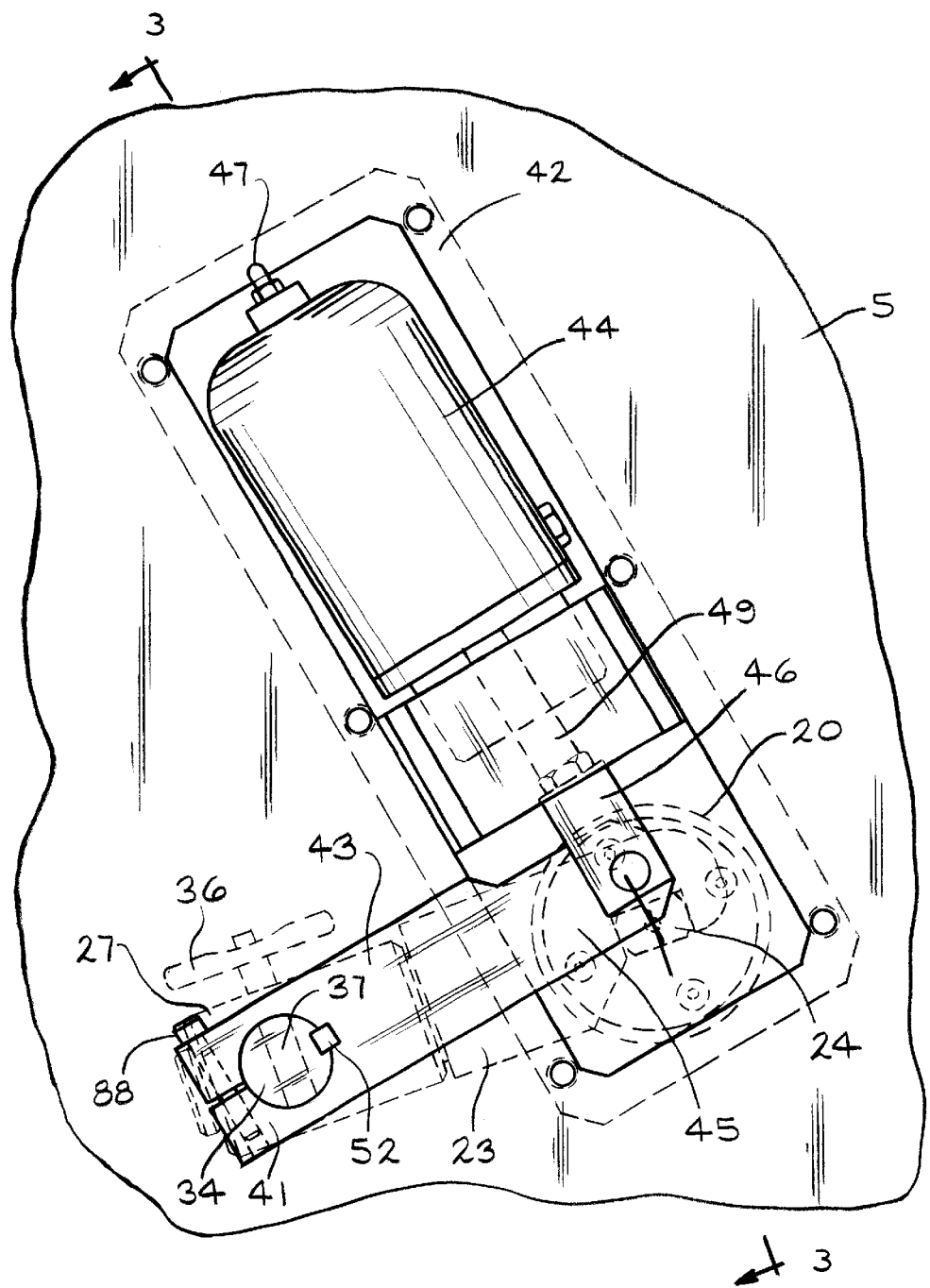
FIG. 4 is a back view of the preferred idler roll mount assembly shown in FIG. 1.
Figure 5:
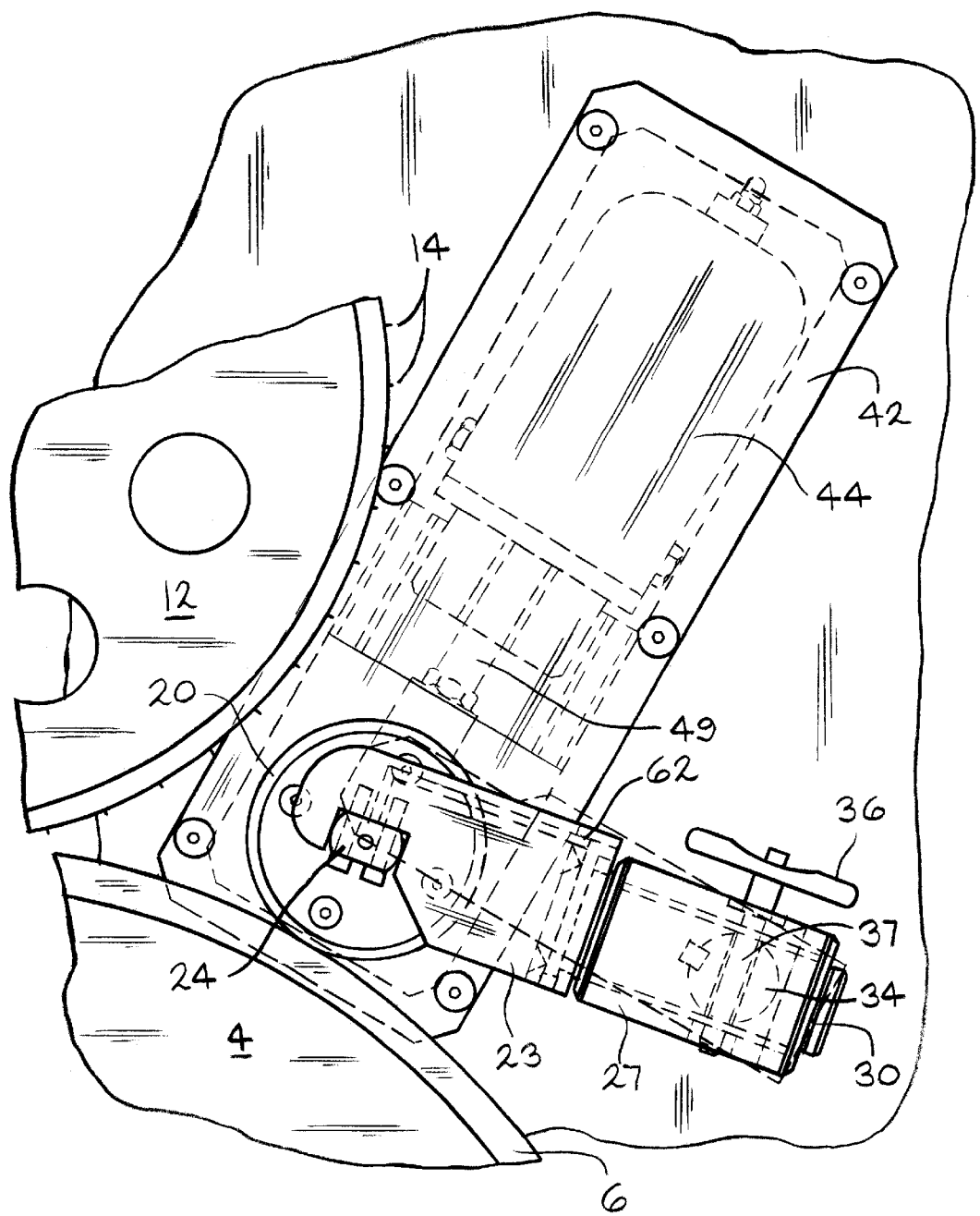
FIG. 5 is a blown-up partial front view of the chopper showing the novel idler roll mount assembly of the present invention.

An inboard portion 38 of the main shaft 34 is preferably held generally horizontally in a rotatable manner by a housing 39 having a cylindrical opening 40 therethrough, an axis of which aligns with the axis of the second cylindrical opening 32 in the connector 26. An outboard end of the housing 39 is preferably attached to the plate 5 of the chopper either directly or preferably to a removable plate 42, which is attached to the plate 5, preferably with bolts. The housing 39 is of a length to preferably allow the inboard portion 38 of the main shaft 34 to extend beyond an inboard end of the housing 39 at least about 0.5 inch to permit any means of applying a torque to the main shaft 34, such as a first end 41 of a torque arm 43 to be fixedly attached to the inboard portion 38 of the main shaft 34 in any suitable manner, such as by a key 52 in a slot or keyway as shown in FIG. 4 and a tightening bolt 88 shown in FIGS. 2 and 4. A first bushing 53 and a second bushing 56, preferably both being lubricated bushings, with a gap 57 therebetween surround the main shaft 34 in the cylindrical opening 40 of the housing 39 to ease the rotation of the main shaft 34.

A fluid cylinder 44, preferably an air cylinder, is located inside the chopper 2 housing on the inboard side of the plate 5 by any suitable means, such as with a cylinder mount 50, with the cylinder rod 49 attached to a clevis 46 attached to a second end portion 45 of the torque arm 43 opposite the first end portion 41. Air or other fluid is fed to the cylinder 44 via either one of a first line 47 or a second line 48 depending on whether the idler roll 20 is being pressed against the elastomer layer 6 or backed away from the elastomer roll 6. A first fluid pressure regulator 51 is connected to line 47, which is used to regulate the amount of force applied to the torque arm 43 which in turn regulates the force the idler roll 20 applies to the elastomer layer 6 and the item being chopped such as strands 1.

Figure 2:
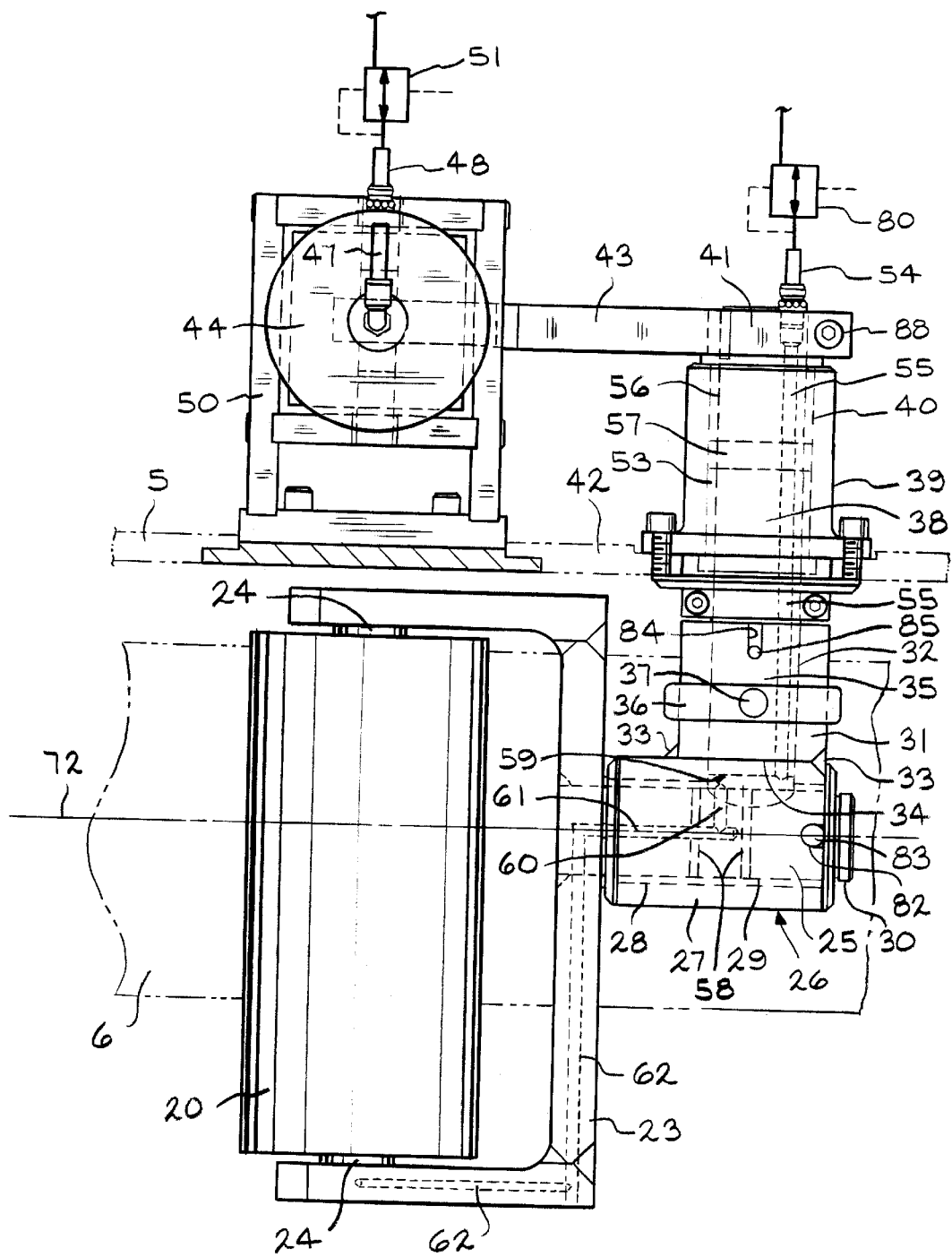
FIG. 2 is a plan view of the preferred idler roll mount assembly shown in FIG. 1.
Figure 3:
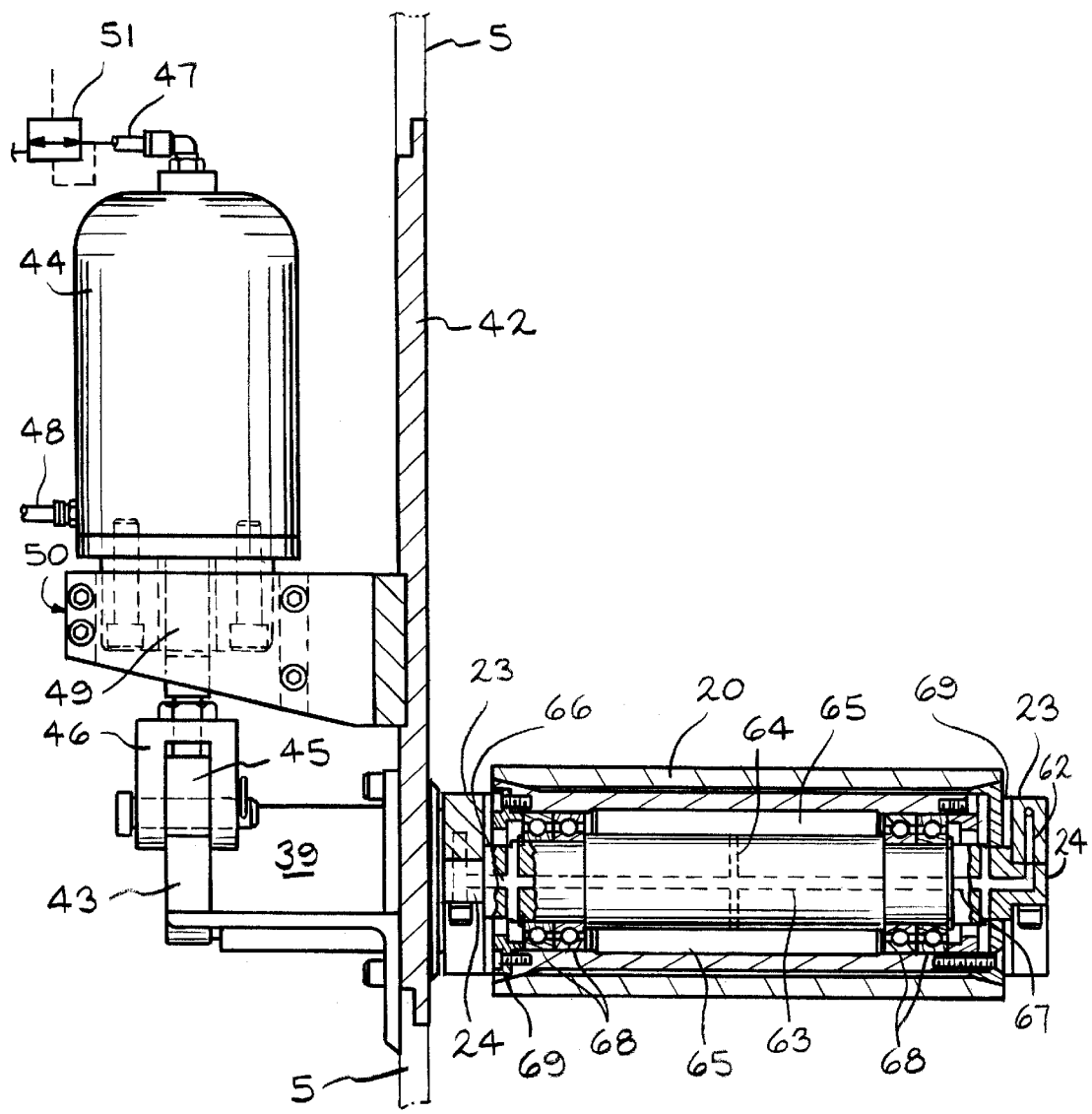
FIG. 3 is an end view of the preferred idler roll mount assembly shown in FIGS. 1 and 2.

Optionally, but preferably, the idler roll mount assembly 22 can also be equipped with an air purge system, shown in FIGS. 2 and 3, to prevent water, chemical sizing and fiber dust that are prevalent in the air surrounding the idler roll and mount from entering the bushings or bearings in the idler roll mount assembly 22 or idler roll 20 and reducing the freeness of rotation of the moving parts. The air purge system comprises a purge air line 54 connected to the end of the inboard portion 38 of the main shaft 34 where it aligns with a first channel 55 that runs through the interior of the main shaft 34 and empties into a cavity 59 at the end of the main shaft 34 and inside the openings in the connector 26. This cavity 59 feeds purge air into a second channel 60 which communicates on one end with a space between the bushing 29 and the stub shaft 25 between two "O" rings 58 and with a third channel 61 on the other end whereby purge air flows through the third channel 61 into the interior of the yoke 23. The third channel 61 preferably lies on an axis 72 of the stub shaft 25.

The third channel 61 communicates with a fourth channel 62, which is in the interior of the yoke 23 and extends to the idler roll axle 24.

A limited amount of purge air can also optionally flow from the cavity 59 out between the stub shaft 25 and the bushing 29 through the first cylindrical opening 28 towards the snap ring 30 and even towards yoke 23 which prevents foreign material from entering this first cylindrical opening 28. Foreign material entering the first cylindrical opening 28 would after a time impede the pivoting movement of the yoke 23 and idler roll 20 and cause non-uniformity in the pressing force exerted by the surface of the rotating idler roll 20 on the items being chopped and the backup roll 6.

The fourth channel 62 empties into a fifth channel 63 (FIG. 3) running down a portion of the length of an axis of the idler roll axle 24. The fifth channel 63 dumps purge air into a sixth channel 64 which preferably, but not necessarily, runs completely through idler roll axle 24 to dump purge air into a reservoir 65. The reservoir 65 preferably, but not necessarily, surrounds a portion of the length of the idler roll axle 24 and communicates with idler roll bearings 68 located near both ends of the idler roll axle 24. The fifth channel 63 also dumps purge air into seventh channel 66 and eighth channel 67 each located at opposite ends portions of the idler roll axle 24 outside of idler roll bearings 68. Purge air escapes from the idler roll through escape spaces 69 at each end portions of the idler roll axle 24 outboard of the seventh and eighth channels 66, 67 to prevent foreign matter from entering the idler roll bearings 68 and various internal clearances which could impede rotation of the idler roll 20. The proper air pressure to achieve these results while conserving high-pressure air is regulated with a second pressure regulator 80 in the second air line 54.

While the preferred purge air system of the present invention has been shown, once given this concept, it will be obvious that many modifications can be made to this system to get the air, or other fluid such as water or other gas, to the desired locations to achieve the same or similar result. Other modifications to the idler roll mount assembly 22 will also be obvious given the disclosure above.

Another optional feature is shown in FIG. 2. A U shaped slot 82 can be formed in the end of the first portion 27 of the connector 26 opposite the yoke 23 and centered above the axis 72 of the stub shaft 25 with the open end of the U being on the edge and end of the connector 26 as shown. A second removable pin 83 is placed in a vertical hole in the stub shaft 25 after the idler roll 20, yoke 23 and stub shaft 25 with snap ring 30 have been installed onto the connector 26. The location of the second removable pin 83, when in the hole in the stub shaft 25 and centered in the U shaped slot 82, is such that when the second removable pin 83 is vertical, the axis of the idler roll 20 is horizontal. The width of the slot 82 is greater than the width of the second removable pin 83 which allows the axis of the idler roll 20 to move off of horizontal a few degrees in clockwise and counter clockwise directions, preferably plus or minus about 2 or 3 degrees, but greater movement can used if desired or necessary.

The second removable pin 83 and wider slot 82 allows the surface of the idler roll 20 to follow different tapers on the peripheral surface across the width of the elastomeric layer 6, but prevents it from rotating up to 180 degrees or more when the backup roll 4 is removed for replacement. If the idler roll 20 were free to rotate without limit, the operator would have to make sure the idler roll 20 was properly oriented before installing the backup roll 4, which takes time and could also be difficult or awkward for one person to accomplish.

Another optional feature is shown in FIG. 2. An elongated U-shaped slot 84 can be formed in the top inboard end of the second portion 31 of the connector 26, preferably centered above a cylindrical axis of the second portion 31. A locator pin 85 protrudes from the top of the main shaft 34, is aligned with the axis of the main shaft 34 and is spaced between the outboard end of the second portion 31 and the hole in the main shaft 34 for the first removable pin 37. The location of the elongated slot 84 and its closed end is such that when the locator pin 85 is in the slot 84 and against the closed end of the elongated slot 84, the first removable pin 37 can be inserted into the appropriate hole for it in the main shaft 34.

When the knurled surface of the idler roll becomes worn it becomes necessary to replace the idler roll 20 with a new or rebuilt one. To do this quickly, the removable pin 37 is pulled out using its handle 36 and the sub-assembly of the connector 26, and attached parts including the idler roll 20, is removed and replaced with a new sub-assembly. This optional feature reduces the time that would otherwise be required to properly position the new connector 26 to allow insertion of the removable pin 37. The open end of the elongated slot 84 can be wider than the closed end portion if desired to make it easier to start the elongated slot 84 around the locator pin 85.

Figure 6:
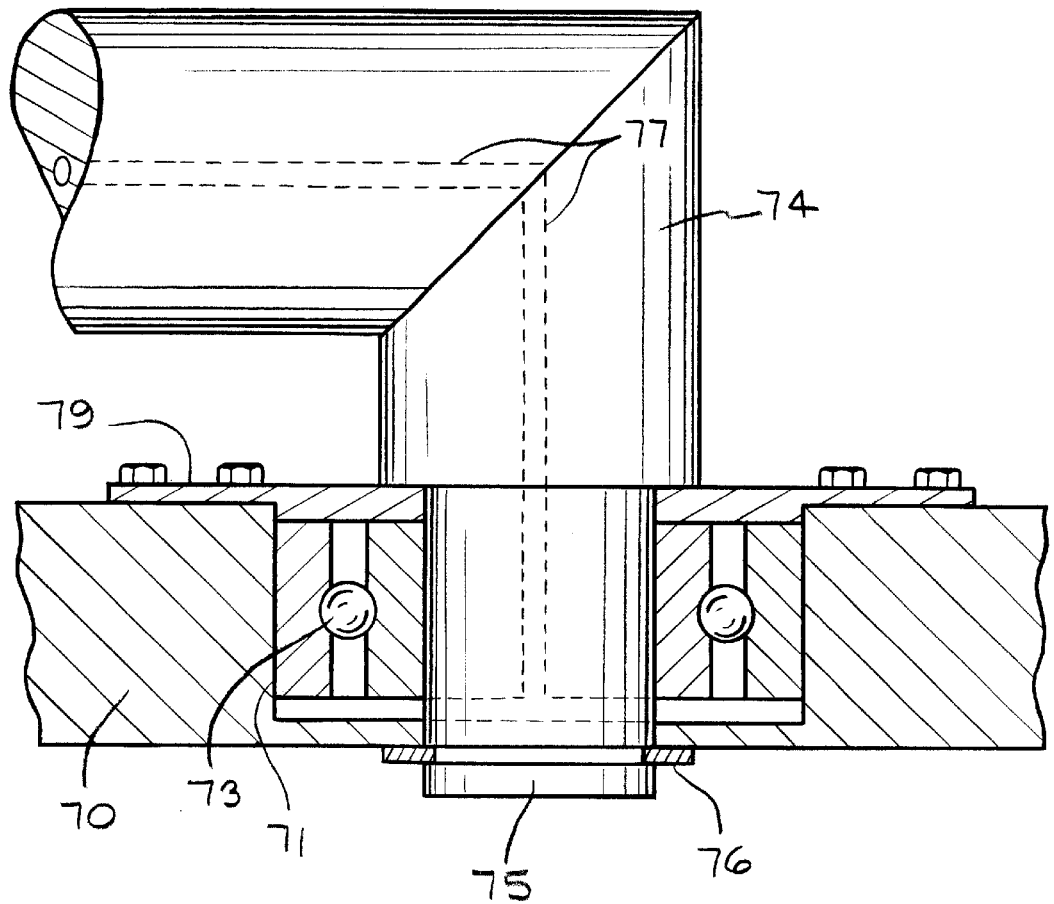
FIG. 6 is a partial plan view showing another embodiment of the novel idler roll mount assembly of the present invention.
Figure 7:
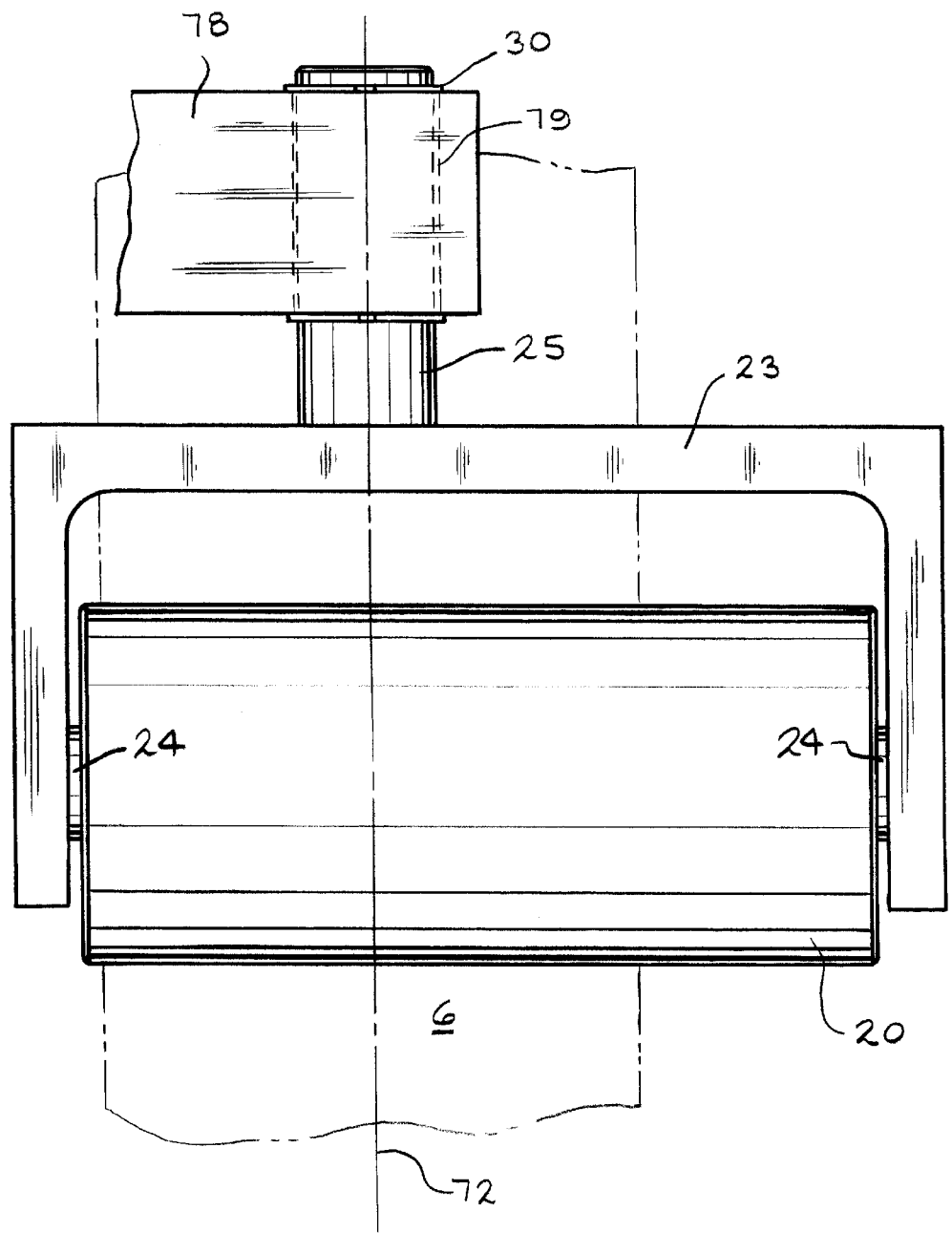
FIG. 7 is a partial plan view showing still another embodiment of the novel idler roll mount assembly of the present invention.

The means for providing rotation of the idler roll yoke 23 to allow the peripheral surface of the idler toll 20 to closely follow the changing surface of the elastomer layer 6 on the backup roll 4 can be varied. Two such variations and different embodiments are shown in FIGS. 6 and 7. FIG. 6 is a partial plan view of another embodiment of the present invention. In this embodiment the idler roll 20 and idler roll axle 24, shown in FIG. 2, are unchanged from the preferred embodiment, but a different C shaped yoke 70 contains the yoke pivot means inside the yoke 70 itself. A cylindrical opening 71 passes partway through the portion of the yoke 70 that spans the idler roll 20, preferably at a location that will align the axis 72 of the opening 71 with or close to the centerline of the elastomer layer 6. By close to is meant within one inch, preferably within 0.5 inch and most preferably within 0.25 inch. A bearing or bushing 73 rests in the larger diameter portion of the opening 71 and on a ledge yoke 70 in the opening 71. In this embodiment an L shaped connector 74, of a type that can be connected to the main shaft 34 in the same or similar manner as connector 26, has a round stub shaft 75 of smaller diameter than the connector 74 on the end opposite the end for connecting to the main shaft 34. The stub shaft 75 passes through the bearing 73 and entirely through the yoke 70 with a snap ring 76, or pin or other retainer, attached to the stub shaft 75 next to the surface of the yoke 70 closest to the surface of the idler roll 20 to hold the yoke 70 onto the connector 74 in a rotatable manner. A modification of this embodiment would use two spaced part bearings in place of the single bearing 73 to improve the structural rigidity. Plate 79, bolted to the yoke 70 as shown retains the bearing 73 in the opening 71.

The embodiment shown in FIG. 6 can optionally be equipped with the air purge concept described above. In such case a passage 77 communicates with a source of high pressure fluid like air in the main shaft 34 on one end and with a space between the opening 71 and the stub shaft 75 to dump air into this space so that the air can flow towards both ends of the opening 71 to keep foreign material out of the opening 71 and to provide an air cushion between the bearing 73 and the connector 77. Additional yoke passages could also be provided to allow purge air to also flow to the idler roll axle 24 in a similar manner as shown in FIG. 2.

FIG. 7 shows a still further embodiment in which the idler roll 20, idler roll axle 24, yoke 23, stub shaft 25 and snap ring 30 are unchanged from the preferred embodiment shown in FIGS. 2–5. A simpler connector 78 is used. The connector attaches to the main shaft 34 in the same manner as the connector 26 in the preferred embodiment, but has only one portion and has a cylindrical opening 79 completely through the connector 78, the axis of the opening being perpendicular to the axis of the main shaft 34. If desired this embodiment can also be equipped with the same or similar air purge system of the preferred embodiment, as well as same or similar shaft bushings and locating pins and guide slots and pins. A still further embodiment places the point of rotation in the stub shaft itself at a point between where the stub shaft 25, attaches to either the connector of FIG. 2 or the main shaft of FIG. 7 and the yoke 23. Other alternative embodiments to achieve the same function of permitting the idler roll to follow the surface of the backup roll and the item(s) being chopped will be obvious to the chopper artisan.

In the preferred embodiment disclosed herein, many of the parts of the novel idler roll and mount assembly are contained within the chopper cabinet behind the front plate 5 to protect the parts from the hostile environment on the outside of the chopper. However, if one wanted to put up with the problems caused by the environment outside the chopper cabinet in front of the front plate 5 more or all of the novel idler roll mount assembly could be located outside the chopper cabinet.

It will be obvious to chopper artisans that the embodiments disclosed and the structures can be modified in several ways without significantly changing the result. For example, instead of an air purge system, a lubricating system using a lubricant compatible with the chopped fiber product can be used. Also, instead of a fluid cylinder 44, various types of springs such as coil, leaf, torsion bar, flexible rods, etc. can be used in a well known manner to apply the force needed to bias the idler roll 20 against the items to be chopped 3 against the elastomer layer 6 of the backup roll 4. All such modifications are within the concept and scope of the present invention described in the following claims.

What is claimed is:

1. A chopper for separating long lengths of unwound item(s) selected from the group consisting of fibers, fiber strands, string, yarn, wire, tape and ribbon into short pieces comprising a frame having a front plate on an outboard, operating side of the chopper, a rotatable backup roll on the outboard of the front plate, the backup roll having an elastomeric peripheral surface, a rotatable blade roll outboard of the front plate, the blade roll having a plurality of blades spaced apart around its periphery for contact with said items and the elastomeric peripheral surface, a rotatable idler roll outboard of the front plate for pressing the item(s) against said elastomeric peripheral surface of the backup roll and an idler roll mount, the improvement comprising an idler roll and mount assembly comprising:

a) a yoke spanning the idler roll and holding each end of the idler roll in a manner that allows the idler roll to freely rotate, b) a connector for connecting the yoke to a means for applying a force to the yoke to bias the idler roll against the item(s) and the elastomeric peripheral surface of the backup roll, the yoke being attached to the connector in a manner that allows the yoke to rotate back and forth to allow the peripheral surface of the idler roll to adjust to changes in taper across the width of the peripheral surface of the elastomer layer of the backup roll as the latter rotates, c) a means for applying a force to the connector such that the peripheral surface of the idler roll is pressed against the peripheral surface of the elastomer layer on the backup roll and/or the item(s) to be chopped located on the peripheral surface of the elastomer layer on the backup roll as the latter rotates.

2. The chopper of claim 1 wherein at least some components of the idler roll mount assembly are located within a cabinet of the chopper, the cabinet being inboard of an outboard face of the front plate and the cabinet being enclosed to protect the components therein.

3. The chopper of claim 2 further comprising a fluid purge system that forces a fluid through the interior of the connector to prevent foreign matter from entering the connector and impeding the back and forth rotation of the yoke.

4. The chopper of claim 3 wherein the fluid is air at a pressure above atmospheric pressure external of the connector.

5. The chopper of claim 3 wherein the fluid purge system also forces fluid into and through the interior of the idler roll to prevent foreign material to enter the interior of the idler roll.

6. The chopper of claim 5 wherein the fluid is air at a pressure above atmospheric pressure external of the idler roll.

7. A chopper for separating long lengths of unwound item(s) selected from the group consisting of fibers, fiber strands, string, yarn, wire, tape and ribbon into short pieces comprising a frame having a front plate on an outboard, operating side of the chopper, a rotatable backup roll on the outboard of the front plate, the backup roll having an elastomeric peripheral surface, a rotatable blade roll outboard of the front plate, the blade roll having a plurality of blades spaced apart around its periphery for contact with said items and the elastomeric peripheral surface, a rotatable idler roll outboard of the front plate for pressing the item(s) against said elastomeric peripheral surface of the backup roll and an idler roll mount assembly, the idler roll mount assembly comprising;

a) a yoke spaced from the idler roll and spanning the length of the idler roll and beyond with two end portions, each end portion connected to one end of the idler roll in a manner that allows the idler roll to freely rotate, b) a connector that holds the yoke in a manner that allows the yoke to rotate back and forth in such a manner that an outer peripheral surface of the idler roll can follow any taper and any change in taper on the backup roll, c) means for applying a force on the yoke to bias the idler roll against the outer peripheral surface of the backup roll or the item(s) on said surface of the backup roll.

8. The chopper of claim 7 wherein said chopper also comprises an enclosed cabinet inboard of an outboard face of the front plate with some of the components of the idler roll mount assembly being located within the cabinet to protect those components from foreign matter outboard of the outboard face of the front plate.

9. The chopper of claim 8 wherein the means for applying a force comprises a fluid cylinder.

10. The chopper of claim 8 further comprising a fluid purge system that forces fluid through the interior of the connector to prevent foreign matter from entering the connector and impeding the back and forth rotation of the yoke.

11. The chopper of claim 10 wherein the fluid is air.

12. The chopper of claim 10 wherein the fluid purge system also forces fluid into and through the interior of the idler roll to prevent foreign matter from entering the interior of the idler roll.

13. The chopper of claim 12 wherein the fluid is air.

14. The chopper of claim 10 wherein the fluid is air.

15. The chopper of claim 8 wherein the means for applying a force comprises a fluid cylinder.

16. The chopper of claim 8 further comprising a fluid purge system that forces fluid through the interior of the connector to prevent foreign matter from entering the connector and impeding the back and forth rotation of the yoke.

17. The chopper of claim 7 wherein the means for applying a force comprises a fluid cylinder.

18. The chopper of claim 7 wherein said chopper also comprises an enclosed cabinet inboard of an outboard face of the front plate with some of the components of the idler roll mount assembly being located within the cabinet to protect those components from foreign matter outboard of the outboard face of the front plate.

19. The chopper of claim 7 wherein the means for applying a force comprises a fluid cylinder.

20. A method of separating long lengths of unwound item(s) selected from the group consisting of fibers, fiber strands, string, yarn, wire, tape and ribbon into short pieces comprising feeding one or more of said item(s) into a chopper comprising a frame having a front plate on an outboard, operating side of the chopper, a rotatable backup roll on the outboard of the front plate, the backup roll having an elastomeric peripheral surface, a rotatable blade roll outboard of the front plate, the blade roll having a plurality of blades spaced apart around its periphery for contact with said items and the elastomeric peripheral surface, a rotatable idler roll outboard of the front plate for pressing the item(s) against said elastomeric peripheral surface of the backup roll and an idler roll mount assembly, the idler roll mount assembly comprising;

a) a yoke spaced from the idler roll and spanning the length of the idler roll and beyond with two end portions, each end portion connected to one end of the idler roll in a manner that allows the idler roll to freely rotate, b) a connector that holds the yoke in a manner that allows the yoke to rotate back and forth in such a manner that an outer peripheral surface of the idler roll can follow any taper and any change in taper on the backup roll, c) means for applying a force on the yoke to bias the idler roll against the outer peripheral surface of the backup roll or the item(s) on said surface of the backup roll.

* * * * *